United States Patent [19]

Cadzow et al.

[11] Patent Number: 4,585,548
[45] Date of Patent: Apr. 29, 1986

[54] RECOVERY OF METAL VALUES FROM MINERAL ORES BY INCORPORATION IN COAL-OIL AGGLOMERATES

[75] Inventors: Mark D. Cadzow, Melbourne, Australia; Graham J. Elkes, Surrey, United Kingdom; Gavin J. Ewin; David E. Mainwaring, both of Melbourne, Australia

[73] Assignee: BP Australia Limited, Victoria, Australia

[21] Appl. No.: 690,495

[22] PCT Filed: Apr. 26, 1984

[86] PCT No.: PCT/AU84/00071
§ 371 Date: Dec. 10, 1984
§ 102(e) Date: Dec. 10, 1984

[87] PCT Pub. No.: WO84/04259
PCT Pub. Date: Nov. 8, 1984

[30] Foreign Application Priority Data

Apr. 29, 1983 [AU] Australia .................. PF9120

[51] Int. Cl.⁴ .................. B03B 1/04
[52] U.S. Cl. .................. 209/5; 209/9; 209/49; 210/633; 210/727
[58] Field of Search .................. 209/1, 5, 9, 49, 233, 209/268; 44/24; 210/633, 704, 705, 714, 727, 738

[56] References Cited

U.S. PATENT DOCUMENTS

| | | | |
|---|---|---|---|
| 3,268,071 | 8/1966 | Puddington et al. | 209/5 |
| 4,089,776 | 5/1978 | McMurray | 209/5 |
| 4,225,422 | 9/1980 | Maskwa | 209/233 X |
| 4,235,709 | 11/1980 | Balidot et al. | 209/5 |
| 4,239,529 | 12/1980 | Kindig et al. | 209/9 X |
| 4,248,697 | 2/1981 | Halvorsen | 209/5 |
| 4,277,252 | 7/1981 | Dudt | 210/727 X |
| 4,389,306 | 6/1983 | Nakanishi et al. | 209/5 |
| 4,396,396 | 8/1983 | Mainwaring | 44/1 C |
| 4,415,335 | 11/1983 | Mainwaring et al. | 44/1 C |
| 4,477,353 | 10/1984 | Messer | 210/633 |

Primary Examiner—Charles Hart
Attorney, Agent, or Firm—Sheridan, Ross & McIntosh

[57] ABSTRACT

Gold ore, or any other mineral treated to have a lyophilic surface, (e.g. chalcopyrites), is ground into a slurry in crusher (1) powdered coal and oil are added at location (2), and the mix is conveyed to a contact zone (3), where any micro-agglomerates formed are kept below 500 microns in size. Sequentially, the mix is passed to an agglomeration zone (4), where larger agglomerates of coal-oil and gold or the lyophilic mineral are allowed to form, then separated at (5) from the gangue (8), and recycle continuously via return line (6) and homogenister (7) to the contact zone (3), until a desired gold or mineral concentration in the agglomerates is achieved. Subsequently, the 'loaded' coal-oil agglomerates are tapped off the return line (6) at (9), either batchwise or continuously, and the metal values are recovered by pyrometallurgical or concentional separation techniques.

19 Claims, 1 Drawing Figure

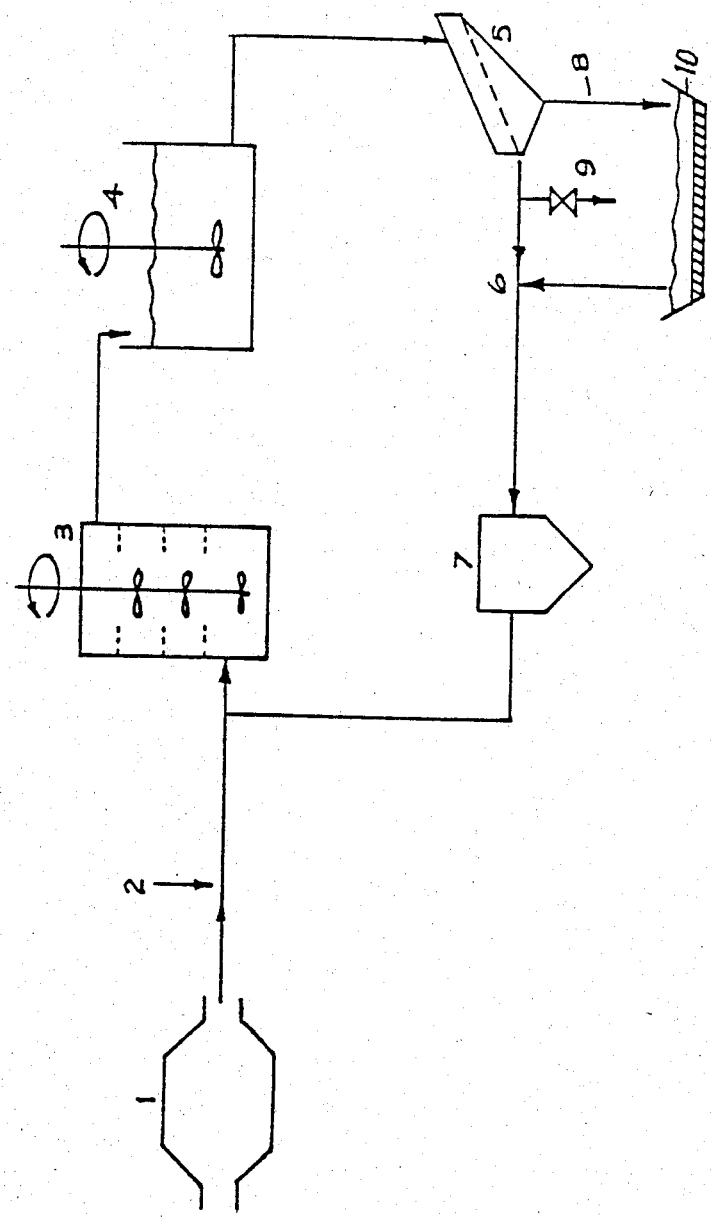

RECOVERY OF METAL VALUES FROM MINERAL ORES BY INCORPORATION IN COAL-OIL AGGLOMERATES

This invention relates to separation of mineral material from ore bodies particularly where the mineral is present in low concentrations.

Proposals have been made to separate minerals by utilizing the lyophilic properties of certain minerals. U.S. Pat. No. 3,268,071 uses a liquid suspendant to separate two materials one of which is lyophilic to said liquid and the other being lyophobic. This technique is difficult to initiate where the mineral which is sought to be recovered is present in low concentrations.

U.K. Pat. No. 161560 (1921) discloses an oil agglomeration of solids with a coal carrier. This specification is specifically concerned with concentration of iron fines in steel mills. There is no suggestion of how this technique can be adapted to recover minerals present in ore bodies in low concentrations.

In Australian Pat. Nos. 450,549 and 475,788 the use of coal char has been proposed for mineral separation but these patents rely on the adsorbent properties of the coal char to adsorb ions from solution in contrast to the present invention which is concerned with minerals in solid mixtures.

It is an object of the present invention to improve the recovery of minerals present in low concentrations.

To this end the present invention provides a method of recovering a mineral having a lyophilic surface present in low concentration in a mixture of solids comprising grinding the mixture of solids forming a slurry of said solids either before or after said grinding step, adding thereto in a contacting zone a carbon source material and hydrocarbon liquid, mixing said slurry of solids, carbon source and hydrocarbon liquid in an agglomeration zone to form agglomerates containing said lyophilic mineral carbon source material and hydrocarbon liquid, separating said agglomerates from the remaining slurry of solids and subsequently recycling said agglomerates to said contacting zone, the size of agglomerates in said contacting zone being below 500 microns and repeating the process until the concentration of lyophillic mineral in the separated agglomerates has reached a desired level and then recovering said mineral from said agglomerates.

Preferably the carbon source material is coal and the hydrocarbon liquid is an oil selected from kerosine, light gas oil or fuel oils. In most cases it is necessary to pretreat the ores to condition them so that the surfaces of the minerals present are rendered either lyophilic or lyophobic.

The minerals to which the present invention is particularly applicable are gold present in its native form, copper present as chalcopyrite and other metallic, metallic sulphide or metallic oxide minerals present in low concentrations. Gold usually requires no pretreatment as its surface is lyophilic. The other minerals normally require the addition of reagents to make their surfaces lyophillic.

An important aspect of this invention is to increase the likelihood of contact between the coal/oil mix and the desired solid. By recycling agglomerates to the contacting zone it is possible to increase the concentration of the desired solid in the coal agglomerates. The number of recycling steps is not critical but depends on the desired level of mineral value recovery. However this is increased if the size of the agglomerates after disintegration is below 500 microns as this increases the available surface contact and the likelihood of contact occurring is increased.

In this invention the carbon source material, hydrocarbon liquid and ground solids are intimately mixed to increase surface contact in the contacting zone by using as the contacting zone a disintegration device selected from a rodmill, a shear scrubber, a pump/pipe loop or an in line mixer or other similar device. Further oil may be added in the agglomeration tank where the mixture is agitated. Residence time in the agglomeriation zone may vary from 5 to 300 minutes and will depend in part on the desired size of the final agglomerates.

A typical plant layout used according to this invention is shown in the drawing.

The ore is crushed by any conventional grinding method in the crusher 1. At this point the ore is usually a slurry. A carbon source and some oil is then added to the ore at point 2. This invention may be operated as a batch operation or continuously if the scale of operation makes a continuous operation feasible.

This mixture is then passed to a high shear scrubber 3 which is the selected contacting device for further conditioning of the ore. It is in the scrubber 3 that disintegrated micro-agglomerates of oil and coal are formed and it is this conditioning which creates the maximum opportunity for contact between the lyophilic ore and the coal/oil agglomerates.

After the scrubber 3 the mix is passed to the agglomerator 4 which is a stirred tank in which agitation of the mix occurs which encourages agglomerate growth. After the agglomeration step the mix is passed to the separator 5. This may comprise a simple screen to separate out agglomerates from the slurry. Alternatively vacuum filtration or similar separation means may be used. This process is operated with continuous removal of gangue and may be operated with either continuous or batch removal of agglomerates.

From the separator 5 the agglomerates are recycled through line 6 to the scrubber 3. Homogenizer 7 may be used to reduce the size of the recycled agglomerates before they enter the contacting zone. Batch or continuous removal of agglomerates containing mineral values can be made through line 9. Also from the separator 5 the gangue or remaining slurry is removed by line 8 to the tailings dispersal dam and water recovery plant 10. After the agglomerates have been recycled sufficiently to achieve the desired mineral value level the mineral values may be separated from the agglomerates by pyro metallurgical techniques wherein the oil and coal are burnt away. However, other conventional separation techniques may be used.

An embodiment of this invention will now be described in relation to the recovery of gold and copper present as chalcopyrite. The ore is crushed and a carbon source (usually coal) and agglomerating oil are added. Any of the known oil agglomeration techniques can be adapted for use in this invention. The spherical agglomerates formed by mixing can be screened from the reject mineral matter. The majority of agglomerates are recycled to be further enriched. A small product offtake of agglomerates is taken at high mineral loading when operating in a continuous mode. The loss of carbon and oil in the product is made up by a small continuous addition to the spherical agglomeration plant.

EXAMPLE 1
Gold

A representative sample of Wongawilli seam coal was ground so that 90% was less than 100 microns. The pulp was split into three equal parts and alluvial gold (−106 microns) was added to each sample. Agglomeration was then carried out as indicated above using Kerosine, light gas oil and fuel oil. A gold assay was carried out on the ashed agglomerates and reject mineral matter with the following results:

TABLE 1

| | | Gold Recovery | | | |
|---|---|---|---|---|---|
| Sample | Oil Type | Wt Agglom Ash (g) | Gold Assay (g/t) | Wt Mineral Matter (g) | Gold Assay (g/t) | Recovery % |
| GOL 1.1 | Kerosine | 13.65 | 2960 | 13.04 | 12.2 | 99.51 |
| GOL 1.2 | LGO | 12.45 | 2700 | 15.00 | 0.5 | 99.98 |
| GOL 1.3 | Fuel Oil | 14.69 | 2220 | 12.10 | 32.4 | 98.80 |

These results show essentially complete recovery of gold into the agglomerates when using light gas oil for agglomeration.

EXAMPLE 2
Gold

Samples of a gold ore with grades between 120 and 0.5 g of gold tonne were treated with the process. Coal and light gas oil were used as the carbon carrier and the hydrocarbon oil respectively. Thirty minutes residence time in a rodmill was used to reduce the size of the recycled agglomerates and to promote contacting between the micro-agglomerates and the gold. A stirred tank was used as the agglomerating zone and a 30 minute residence time for agglomeration was allowed. The agglomerates were recycled four times.

The results in the following Table show that after four recycles high recoveries of gold were achieved.

| Grade of Ore g of gold/tonne | Recovery of gold % by mass |
|---|---|
| 120.5 | 97.2 |
| 23.3 | 98.6 |
| 5.2 | 93.5 |
| 2.5 | 88.0 |
| 0.6 | 60.0 |

EXAMPLE 3
Gold

The system described in Example 2 was used to treat a sample of gold ore in which the agglomerates were recycled 20 times. The overall recovery of gold was 97.2% and the grade of the agglomerates at the end of the experiment was 1300 g of gold/tonne.

EXAMPLE 4
Copper (Chalcopyrite)

Experiments were carried out to form coal/chalcopyrite agglomerates and to use the agglomerates as recycle feed for a second agglomeration thus:

The agglomeration was carried out using the following proportions of chalcopyhrite/coal/quartz

| Chalcopyrite | 4.7% of solids |
|---|---|
| Coal | 20% of solids |
| Quartz (as diluant) | 75.3% of solids |

Aerophine was used as a chalcopyrite promoter; pulp density for agglomeration was 10%.

Results of the agglomeration carried out are given in Table 2.

TABLE 2

| | | Chalcopyrite Collection | | | | |
|---|---|---|---|---|---|---|
| SAMPLE | % Light Gas Oil | Wt. Dried Agglomerates g | % Cu | Wt. Dried Reject g | % Cu | % Recovery to Agglomerates |
| CHL 1.1 | 25 | 9.61 | 5.85 | 41.34 | 0.248 | 84.5 |
| CHL 1.2 | 25 | | | 40.68 | 0.235 | 84.6 |
| | 5 | 11.41 | 8.98 | 39.98 | 0.311 | 80.1 |

Note:
CHL 1.1 - Agglomeration with 25% light gas oil
CHL 1.2 - Agglomeration with 25% light gas oil, then agglomerates added to a standard charge except for coal and re-agglomerated with additional 5% light gas oil.

The results show that high recoveries of copper into the agglomerates can be achieved and that the agglomerates can be recycled to collect further copper, again with high efficiency.

The main advantages seen for the technique are:

(i) Agglomeration has the ability to give very high recoveries of required minerals. The process operates in a way which is independent of feed particle size in the range of interest (less than 500 microns). In this respect, agglomeration is superior to other methods of collection, such as flotation, where particle size is a significant factor in collection efficiency. The invention allows these benefits of agglomeration to be obtained on low grade materials by successive loading and applies particularly to gold where concentrations are less than 100 ppm.

(ii) The coal/carbon used in the agglomeration can be used in some instances in further processing steps required (e.g. roasting a sulphide ore).

(iii) Concentration by agglomeration could be carried out at a mine site and, because of the ease of handling of the spherical agglomerates, these could then be transported to a centralised refining plant.

The claims defining the invention are as follows:

1. A method of recovering a mineral selected from the group consisting of metal, metal oxide and metal sulfide, having a lyophilic surface, present in low concentration in a mixture of solids, comprising: grinding the mixture of solids, forming a slurry of said solids, adding thereto in a contacting zone a carbon source material and a hydrocarbon liquid, mixing said slurry of solids, carbon source and hydrocarbon liquid in an agglomeration zone to form agglomerates containing said lyophilic mineral, carbon source material and hydrocarbon liquid, separating said agglomerates from the remaining slurry of solids and subsequently recycling said separated agglomerates to said contacting zone, the size of agglomerates in said contacting zone, being below 500 microns, and repeating the process until the concentration of said lyophilic mineral in the separated agglomerates has reached a desired level and then recovering said mineral from said agglomerates.

2. A method as claimed in claim 1 in which the carbon source material, hydrocarbon liquid and ground solids are intimately mixed to increase surface contact in the contacting zone by using as the contacting zone a disintegration device selected from a rodmill, a shear scrubber, a pump/pipe loop or an in-line mixer.

3. A method as claimed in claim 1 wherein further hydrocarbon liquid is added in the agglomeration zone.

4. A method as claimed in claim 1 wherein the carbon source material is coal.

5. A method as claimed in claim 2 wherein further hydrocarbon liquid is added in the agglomeration zone.

6. A method as claimed in claim 1 wherein said slurry is formed before said grinding.

7. A method as claimed in claim 1 and further comprising: reducing the size of said recycled agglomerates before they are entered into said contacting zone.

8. A method as claimed in claim 7 wherein said lyophilic mineral is gold.

9. A method as claimed in claim 8 wherein said gold is present in said mixture of solids in an amount less than 100 ppm.

10. A method as claimed in claim 9 wherein said recovering of said mineral from said agglomerates comprises a pyrometallurgical technique.

11. A method of recovering a mineral selected from the group consisting of metal, metal oxide and metal sulfide, present in low concentration in a mixture of solids comprising: providing said mineral with a lyophilic surface, grinding the mixture of solids, forming a slurry of said solids, contacting said slurry with a carbon source material and a hydrocarbon liquid in a contacting zone, mixing said slurry of solids, carbon source and hydrocarbon liquid in an agglomeration zone to form agglomerates containing said mineral, carbon source and hydrocarbon liquid, separating said agglomerates from the remaining slurry of solids, recycling said separated agglomerates to said contacting zone, and increasing the likelihood of contact between the carbon source and hydrocarbon liquid with said mineral by controlling the size of said recycled agglomerations.

12. A method as claimed in claim 11 wherein said lyophilic surface is provided by nature.

13. A method as claimed in claim 11 wherein said lyophilic surface is provided by treatment with a reagent.

14. A method as claimed in claim 11 wherein the size of agglomerates is controlled to be less than 500 microns.

15. A method as claimed in claim 14 and further comprising: adding additional hydrocarbon liquid in said agglomeration zone.

16. A method as claimed in claim 15 and further comprising: reducing the size of said separated agglomerates before they are entered into said contacting zone.

17. A method as claimed in claim 16 wherein said mineral is gold.

18. A method as claimed in claim 16 wherein said mineral is chalcopyrite.

19. A method as claimed in claim 17 wherein said gold is present in said mixture of solids in an amount less than 100 ppm.

* * * * *